US012218790B2

(12) United States Patent
Anicic et al.

(10) Patent No.: US 12,218,790 B2
(45) Date of Patent: Feb. 4, 2025

(54) SYSTEM AND METHOD FOR EXCHANGING DATA BETWEEN A SERVER AND A CLIENT IN AN INDUSTRIAL DATA NETWORK

(71) Applicant: Siemens Aktiengesellschaft, Munich (DE)

(72) Inventors: Darko Anicic, Munich (DE); Corina Kim Schindhelm, Gröbenzell (DE); Martin Winter, Rosenheim (DE)

(73) Assignee: Siemens Aktiengesellschaft, Munich (DE)

( * ) Notice: Subject to any disclaimer, the term of this patent is extended or adjusted under 35 U.S.C. 154(b) by 111 days.

(21) Appl. No.: 17/715,109

(22) Filed: Apr. 7, 2022

(65) Prior Publication Data

US 2022/0345354 A1 Oct. 27, 2022

(30) Foreign Application Priority Data

Apr. 8, 2021 (EP) .................................... 21167424

(51) Int. Cl.
*G06F 15/16* (2006.01)
*G06F 40/20* (2020.01)
(Continued)

(52) U.S. Cl.
CPC ............ *H04L 41/045* (2022.05); *G06F 40/20* (2020.01); *G06F 40/40* (2020.01); *H04L 12/66* (2013.01); *H04L 69/08* (2013.01); *G06F 40/30* (2020.01)

(58) Field of Classification Search
CPC ....... H04L 41/045; H04L 12/66; H04L 69/08; H04L 67/565; H04L 67/12; G06F 40/20;
(Continued)

(56) References Cited

U.S. PATENT DOCUMENTS

2016/0085389 A1* 3/2016 Mahmud ................ G06F 16/51 715/838
2019/0104055 A1* 4/2019 Craciunas .............. H04L 47/28
(Continued)

OTHER PUBLICATIONS

"A formal mapping between OPC UA and the Semantic Web," 2019 IEEE 17th International Conference on Industrial Informatics (INDIN), Helsinki, Finland, Jul. 22-25, 2019, pp. 33-40 (Year: 2019).*
(Continued)

*Primary Examiner* — Vivek Srivastava
*Assistant Examiner* — Karina J Garcia-Ching
(74) *Attorney, Agent, or Firm* — Cozen O'Connor

(57) ABSTRACT

A system and a method for exchanging data between a server and a client in an industrial data network, wherein the server employs a first information model for information interchange and the client employs a second information model for information interchange, where the method includes converting the first and the second information models in a first and a second machine-interpretable description, deducing similarities between elements of the first and the second machine-interpretable description, proposing and implementing a mapping of at least one element of the first information model to an element of the second information model based on the deduced similarities in text and in structure and, employing, by a gateway entity, the mapping for a data exchange between the server and the client such that the semantic mapping of virtually any input, vendor-specific metadata, and any output model (including OPC UA-based models) is achieved.

14 Claims, 20 Drawing Sheets

(51) Int. Cl.

| | |
|---|---|
| ***G06F 40/40*** | (2020.01) |
| ***H04L 12/66*** | (2006.01) |
| ***H04L 41/045*** | (2022.01) |
| ***H04L 69/08*** | (2022.01) |
| *G06F 40/30* | (2020.01) |

(58) Field of Classification Search

CPC ...... G06F 40/40; G06F 40/30; G06F 16/3344; G06F 16/31; G06F 16/367; G06F 16/38; G06F 16/9024

USPC .......................................................... 709/203

See application file for complete search history.

(56) References Cited

U.S. PATENT DOCUMENTS

2019/0171342 A1* 6/2019 Reichard ................. H04L 67/34
2020/0210869 A1 7/2020 Anicic et al.

OTHER PUBLICATIONS

EP Search Report dated Sep. 21, 2021 based on EP21167424 filed Apr. 8, 2021.

* cited by examiner

FIG 5

```
...
<NamespaceUris>
            <Uri>http://opcfoundation.org/UA/DI/</Uri>
            <Uri>http://www.euromap.org/euromap83/</Uri>
            <Uri>http://www.euromap.org/euromap77/</Uri>
            <Uri>http://myManufacturer.org/EuromapInterface</Uri>
</NamespaceUris>
...
<UAObject NodeId="ns=4;i=1052" BrowseName="4:InjectionUnit_1">
            <DisplayName>InjectionUnit_1</DisplayName>
            <References>
                      <Reference ReferenceType="HasTypeDefinition">ns=3;i=1028</Reference>
                      <Reference ReferenceType="Organizes"
                                            IsForward="false">ns=4;i=1001
                      </Reference>
            </References>
</UAObject>
</UAVariable DataType="String" NodeId="ns=4;i=1053" BrowseName="3:BarrelId"
             ParentNodeId="ns=4;i=1052">
             <DisplayName>BarrelId</DisplayName>
             <Discription>Id (e.g. serial number) of the barrel</Description>
             </References>
                      <Reference ReferenceType="HasProperty"
                                 IsForward="false">ns=4;i=1052
                      </Reference>
                      <Reference ReferenceType="HasTypeDefinition">i=68</Reference>
             </References>
             <Extensions>
                      <Extension>
                      <si:VariableMapping>
                                 "InjectionUnits"."injectionUnit1"."barrelId"
                      </si:VariableMapping>
                      </Extension>
            </Extensions>
            <Value>
                      <uax:String></uax:String>
            </Value>
</UAVariable>
```

FIG 8

```
▾<Interface>
 ▾<Sections xmlns="http://www.siemens.com/automation/Openness/SW/Interface/v3">
  ▾<Section Name="Static">
   ▾<Member Name="injectionUnit1" Datatype="Struct" Remanence="NonRetain" Accessibility="Public">
    ▾<AttributeList>
      <BooleanAttribute Name="ExternalAccessible" SystemDefined="true">true</BooleanAttribute>
      <BooleanAttribute Name="ExternalVisible" SystemDefined="true">true</BooleanAttribute>
      <BooleanAttribute Name="ExternalWritable" SystemDefined="true">true</BooleanAttribute>
      <BooleanAttribute Name="UserVisible" Informative="true" SystemDefined="true">true</BooleanAttribute>
      <BooleanAttribute Name="UserReadOnly" Informative="true" SystemDefined="true">false</BooleanAttribute>
      <BooleanAttribute Name="UserDeletable" Informative="true" SystemDefined="true">true</BoolleanAttribute>
      <BooleanAttribute Name="SetPoint" SystemDefined="true">false</BoolleanAttribute>
    </AttributeList>
   ▾<Member Name="barrelId" Datatype="WString">
    ▾<AttributeList>
      <BooleanAttribute Name="ExternalAccessible" SystemDefined="true">true</BooleanAttribute>
      <BooleanAttribute Name="ExternalVisible" SystemDefined="true">true</BooleanAttribute>
      <BooleanAttribute Name="ExternalWritable" SystemDefined="true">true</BooleanAttribute>
      <BooleanAttribute Name="UserVisible" Informative="true" SystemDefined="true">true</BooleanAttribute>
      <BooleanAttribute Name="UserReadOnly" Informative="true" SystemDefined="true">false</BooleanAttribute>
      <BooleanAttribute Name="UserDeletable" Informative="true" SystemDefined="true">true</BoolleanAttribute>
      <BooleanAttribute Name="SetPoint" SystemDefined="true">false</BoolleanAttribute>
    </AttributeList>
    ▾<Comment>
     ▾<MultiLanguageText Lang="en-US">
       The BarrelId Property provides the Id (e.g. serial number) of the barrel.
      </MultiLanguageText>
    </Comment>
       <Start Value>WSTRING#'123123'</StartValue>
   </Member>
   ▾<Member Name="index" Datatype="UDInt">
    ▾<AttributeList>
      <BooleanAttribute Name="ExternalAccessible" SystemDefined="true">true</BooleanAttribute>
      <BooleanAttribute Name="ExternalVisible" SystemDefined="true">true</BooleanAttribute>
      <BooleanAttribute Name="ExternalWritable" SystemDefined="true">true</BooleanAttribute>
      <BooleanAttribute Name="UserVisible" Informative="true" SystemDefined="true">true</BooleanAttribute>
```

FIG 9

```
# ElementTypes
# 1 ... Struct
# 22 .. Float64
# 23 .. Bool
# 25 .. String

TypeName
InjectionUnitType.InjectionUnit                         1
        State                                           1
                 Index                                  22
                 BarrelId                               25
                 IsPresent                              23
                 InProduction                           23
                 ScrewDiameter                          22
                 MaxScrewStroke                         22
                 ScrewVolume                            22
                 ScrewId                                25
                 TemperatureZones                       1

# Datapoint/DpId
DpName                           TypeName
InjectionUnit_1                  InjectionUnitType
```

FIG 13

```
PREFIX  :  <http://www.ontotext.com/graphdb/similarity/>
PREFIX inst: <http://www.ontotext.com/graphdb/similarity/instance/>
PREFIX pred: <http://www.ontotext.com/graphdb/similarity/psi/>>
insert {
         inst:OPC-UA-index :createIndex "-termweight idf" ;
                 :analyzer
"org.apache.lucene.analysis.en.EnglishAnalyzer" ;
                 :documentID ?documentID .
                 ?documentID :documentText ?documentText .
} where {
         SELECT ?documentID ?documentText {
                 ?documentID ?p ?documentText .
                 filter(isLiteral(?documentText))
         }
}
```

FIG 14

```
PREFIX  :<http://www.ontotext.com/graphdb/similarity/>
PREFIX inst: <http://www.ontotext.com/graphdb/similarity/instance/>
PREFIX pubo: <http://www.ontology.ontotext.com/publishing#>
PREFIX rdfs: <http://www.w3.org/2000/01/rdf-schema#>
PREFIX rdf: <http://www.w3.org/1999/02/22-rdf-syntax-ns#>
PREFIX owl: <http://www.w3.org/2002/07/owl#>
PREFIX base: <http://opcfoundation.org/UA/>
SELECT ?tag1 ?score1 {
     ?search1 a inst:Index_1 ;
     :searchTerm "barrel";
     :searchParameters "";
     :ducumentResult ?result1 .
     ?result1 :value ?tag1 ;
     :score ?score1.
     ?tag1 rdfs:subClassOf ?bn1 .
         ?bn1 rdf:type owl:Restriction ;
                             owl:allValuesForm base:String ;
                             owl:onProperty base:dataType .
                   ?barrelVar rdfs:subClassOf ?bn1 .
}
```

FIG 15

| | documentID | score |
|---|---|---|
| 1 | NS5:i6018 | "0.6447993683891877"^^xsd:double |
| 2 | NS5:i6097 | "0.6447993683891877"^^xsd:double |

FIG 17

```
PREFIX  :<http://www.ontotext.com/graphdb/similarity/>
PREFIX inst: <http://www.ontotext.com/graphdb/similarity/instance/>
PREFIX pubo: <http://www.ontology.ontotext.com/publishing#>
PREFIX rdfs: <http://www.w3.org/2000/01/rdf-schema#>
PREFIX NS0: <http://opcfoundation.org/UA/>

PREFIX rdf: <http://www.w3.org/1999/02/22-rdf-syntax-ns#>
PREFIX owl: <http://www.w3.org/2002/07/owl#>
SELECT DISTINCT ?tag1 ?score1 ?tag2 ?sore2 ?parent {
    ?search1 a inst:OPC-UA-index ;
         :searchTerm "barrel";
         :searchParameters "";
         :ducumentResult ?result1 .
    ?result1 :value ?tag1 ;
             :score ?score1.
             ?tag1 rdfs:subClassOf NS0:String .

             ?search2 a inst:OPC-UA-index ;
         :searchTerm "screw diameter";
         :searchParameters "";
         :ducumentResult ?result2 .
    ?result2 :value ?tag2 ;
             :score ?score2.
             ?tag2 rdfs:subClassOf NS0:Float64 .

    ?parent rdfs:subClassOf ?bn3 .
    ?bn3 rdf:type owl:Restriction ;
             owl:allValuesFrom ?tag1 .
    ?parent rdfs:subClassOf ?bn4 .
             ?bn4 rdf:type owl:Restriction ;
             owl:allValuesFrom ?tag2 .
}
```

FIG 18

| | tag1 | score1 | tag2 | score2 | parent |
|---|---|---|---|---|---|
| 1 | NS5:i6018 | "0.6447993683891877"^^xsd:double | NS5:i6100 | "0.8627874883209437"^^xsd:double | NS5:i5027 |
| 2 | NS5:i6097 | "0.6447993683891877"^^xsd:double | NS5:i6183 | "0.8627874883209437"^^xsd:double | NS5:i5027 |

SYSTEM AND METHOD FOR EXCHANGING DATA BETWEEN A SERVER AND A CLIENT IN AN INDUSTRIAL DATA NETWORK

BACKGROUND OF THE INVENTION

1. Field of the Invention

The present invention relates to industrial automation systems and, more particularly, to a system and method for exchanging data between a server and a client in an industrial data network.

2. Description of the Related Art

The goal of the platform independent Open Platform Communications OPC Unified Architecture (OPC UA) protocol and its information models is to facilitate standardized and interoperable communication for industrial automation. The interoperability in this context is the ability of industrial automation systems (or their parts of) to exchange data with unambiguous, shared meaning. This characteristic greatly reduces implementation effort and enables communication with cross-manufacturer industrial equipment. Apart from this, applications that operate on data from industrial equipment can be developed independently from the equipment, no matter where in an architecture the applications execute. The only prerequisite for communication with an industrial automation system is to use the OPC UA communication interface and its standardized information model. In order to feature the standardized and interoperable communication, new industrial automation systems may be designed to be compliant with the OPC UA standard.

However, if an existing ("brownfield") automation system needs to have the same feature, then the system needs to be integrated with the standard.

FIG. 1 shows the creation of a standardized information model for existing field devices with a brownfield programmable logic controller (PLC), which has been engineered with an Engineering Tool. The Engineering Tool contains all necessary information for the operation of the PLC, but this information is provided in a vendor-proprietary data model (denoted as "Unknown system structure" in FIG. 1). This information needs to be mapped into OPC UA standardized information models (denoted with "Information Mapping" in FIG. 1). In this way a new standardized server interface for the PLC is generated, which is fully described with an OPC UA information model (denoted as "Standard inform. model" in FIG. 1). This model can be hosted by the PLC (if the PLC has an OPC UA server).

Moreover, the model can be passed to any OPC UA client to access data from the PLC (see FIG. 1). Developers can now easily create applications without knowing specific details of the PLC from various vendors, knowledge about the standardized model is enough. It also does not matter where the OPC UA client runs in an architecture (on Edge, Cloud or somewhere else), and whether the client is an application or another industrial equipment. Overall, the standardized information model of field devices enhances interoperability in industrial automation.

The technical challenge for the underlying invention is that mapping from a vendor-proprietary data model into an OPC UA standardized information model is not a trivial task. First, the origin data model may significantly differ from OPC UA information models. Second, the OPC UA information models are rich and therefore complex. Thus, performing such a task today is mostly done manually, hence, an expensive and error prone work.

FIG. 2 shows the creation of a standardized information model for existing field devices via a gateway with a brownfield PLC, which does not host an OPC UA server. Here, a gateway is needed to provide a protocol binding between the PLC's protocol and OPC UA protocol. Further on, the gateway hosts an OPC UA server, which exposes the standardized interface with an OPC UA information model of the PLC. Instead of a gateway, architectures in which a platform is used exist. The platform typically integrated diverse devices and offers its own information model. There may still be the desire for this model to map into an OPC UA standardized information model. The task of mapping a vendor-proprietary data model into an OPC UA standardized information model is as challenging as in the first case (see FIG. 1).

Applicants' instant invention solves the problem of mapping the metadata of existing automation systems and devices into a common, standardized information model. Accordingly, applicants' invention enables data exchange between systems and devices with different information models. Existing metadata may come in different forms, ranging from simple tags to more complex engineering object models, see the left-hand part of FIG. 3.

FIG. 1 illustrates mapping of metadata from existing automation systems into OPC UA information models. This metadata is typically available from existing engineering tools or platforms and needs to be mapped into standardized data models. As an example, OPC UA information model is used for a standardized model, accompanied with domain specific extensions known as OPC UA Companions. OPC UA information models are organized so that each layer provides additional information, ranging from basic OPC UA concepts up to domain-specific information, even vendor-specific information, and so forth. The OPC UA information model is not a single model, but rather an information stack, see the right-hand part of FIG. 3. Thus, it is difficult, time-consuming, and error-prone to map tags or information artifacts from an existing engineering data model into semantically equivalent constructs of the OPC UA information models.

In the underlying invention a solution for the described problem is provided. The solution is not limited to OPC UA information models.

In the art there exist tools, such as Siemens OPC UA modelingeditor (SiOME), which can be used for the task of mapping of existing vendor-specific metadata into standardized OPC UA models, see FIG. 4.

FIG. 4 shows the mapping of existing vendor-specific metadata into standardized OPC UA models with a graphical tool. Shown on the right-hand side of FIG. 4 is the existing metadata, e.g., from an engineering tool or a platform (in this case FIG. 4 shows Siemens' TIA Portal tool). Shown on the left-hand side of FIG. 4 is OPC UA-based information models that a user wants to map into. Shown in the middle part of the figure is a mapping. A user may accomplish this mapping by dragging and dropping information artifacts from the right to the left.

FIG. 5 shows a snippet of a final OPC UA NodeSet after the mapping of vendor-specific metadata into standardized OPC UA models. Thus, FIG. 5 represents an OPC UA node set, which implements the mapping. This node-set is automatically generated from the graphical tool. Although the tool provides a great help in the task of mapping, the user still needs to find manually the appropriate information artifacts from a standardized model. As previously stated, OPC UA models are extensive and demand significant knowledge before they can be used. Thus, it is difficult, time-consuming, and error-prone to map information from an existing engineering data model into semantically equivalent constructs of the OPC UA information models, even with the help of such tools.

SUMMARY OF THE INVENTION

In view of the foregoing, it is therefore an object of the invention to provide a method and a system for supporting the mapping of information models for data exchange in industrial data networks.

This and other object of the invention are achieved in accordance with the invention by a method for exchanging data between a server and a client in an industrial data network, where the server employs a first information model for information interchange, and where the client employs a second information model for information interchange. The method includes, in a first step, converting the first and the second information models in a first and a second machine-interpretable description, in a second step, deducing similarities between elements of the first and the second machine-interpretable description, in a third step, based on the deduced similarities in text and in structure, proposing and implementing a mapping of at least one element of the first information model to an element of the second information model and, in a fourth step, employing, by a gateway entity, the mapping for a data exchange between the server and the client. In this way, the methods provides benefits in terms of time a user needs to spend on the mapping, and occurrence of the achieved mapping. The solution is general in a sense that it provides the semantic mapping of virtually any input, vendor-specific metadata, and any output model (including OPC UA-based models).

It is also an object of the invention to provide a system for exchanging data between a server and a client in an industrial data network, where the server employs a first information model for information interchange, and where the client employs a second information model for information interchange. The system comprises a converting unit for converting the first and the second information models in a first and a second machine-interpretable description, a deducing unit for deducing similarities between elements of the first and the second machine-interpretable description, a suggestion unit for proposing and implementing, based on the deduced similarities in text and in structure, a mapping of at least one element of the first information model to an element of the second information model, and a gateway entity employing the mapping for a data exchange between the server and the client. With such a system, the advantages described in connection with the method can be achieved.

An advantageous application of the invention is given if the server is an industrial controller, if the first information model is a tag-based information model described by first meta-data, and if the first meta-data is used as the first machine-interpretable description. In particular, the client might be an industrial application employing a standardized OPC UA information model. Here, the OPC UA information model should be converted into a Resource Description Framework/Web Ontology Language (RDF/OWL) representation, where the RDF/OWL representation forms the second machine-interpretable representation.

In the second step, a number of full-text similarity indices over the machine-interpretable description can be built, where each similarity index covers a specific type of an standardized information model, and one of the indices for the deduction of the second step can be chosen.

After the third step, the mapping information in a data structure, i.e., a Knowledge Pack, can be built and stored and be deployed to the gateway entity. Thus, the mapping information is portable and re-usable for other applications. Furthermore, the knowledge pack might serve as a starting point for new mapping tasks.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An example of the invention will be explained via the drawings, in which:

FIG. 5 shows a snippet of a final OPC UA NodeSet after the mapping of vendor-specific metadata into standardized OPC UA models in accordance with the prior art;

FIG. 8 is an exemplary snippet of an AutomationML file in accordance with the invention;

FIG. 9 shows an example of tag-based field meta-data in accordance with the invention;

FIG. 13 shows an example SPARQL query for building similarity index for our OPC UA example model in accordance with the invention;

FIG. 14 illustrates an exemplary SPARQL query for finding a leaf node based on tag and data type in accordance with the invention;

FIG. 15 shows an exemplary result from the SPARQL query of FIG. 14 in accordance with the invention;

FIG. 17 discloses an exemplary SPARQL query for finding a connecting node for two leaf nodes in accordance with the invention;

FIG. 18 shows exemplary results from the SPARQL query of FIG. 17;

DETAILED DESCRIPTION OF THE EXEMPLARY EMBODIMENTS

In the process of mapping the metadata of existing automation systems and devices into a standardized information models there are three distinguishable phases: Definition, Mapping, and Instantiation (see the right-hand side of FIG. 6). These three phases could be, for example, applied in an Information Modeling Tool to easy the process of mapping.

In the Definition phase, OPC UA information models including Companions are chosen that should be used to describe an existing automation system or device. For example, in order to create an OPC UA machine interface for injection molding machine, then the following standardized models may be chosen as target models:

Device Information Model (OPC UA DI)—Companion Specification featuring an Information Model for Devices; EUROMAP 77 Companion Specification, which describes the interface for data exchange between injection molding machines (IMM) and manufacturing execution systems (MES);

EUROMAP 83 Companion Specification, which is a standardized model for general information regarding plastics and rubber machines.

In the Instantiation phase, an OPC UA machine interface for a device (or machine) is created by instantiating standard models for the machine.

The Definition and Instantiation phases belong to a common practice when OPC UA information models are used. These phases are completed with existing OPC UA information modelling tools such as, SiOME. Thus, they are not subject of this work.

In the Mapping phase, metadata (simple tags or engineering object models) must be mapped, from an existing automation system or device, into instantiated (target) models. The Mapping phase is nowadays accomplished manually. It requires a lot of know-how, is time-consuming and error prone.

Applicants' instant invention solves the problem of mapping by utilizing a Semantic Mapping approach. Semantic mapping automatically maps data from origin models to target models via deduction of textual and structure-based similarities and the sophisticated combination of the results.

In the following, the approach is motivated and explained in more detail with examples. It should be noted that during the mapping phase, new instances may be created. Thus, the border between the Instantiation and Mapping phases is not strict. It should also be noted that the information flow between Definition, Instantiation, and Mapping exist, but this information is not marked with arrows (they represent phases rather than the processing components).

Figure 1:
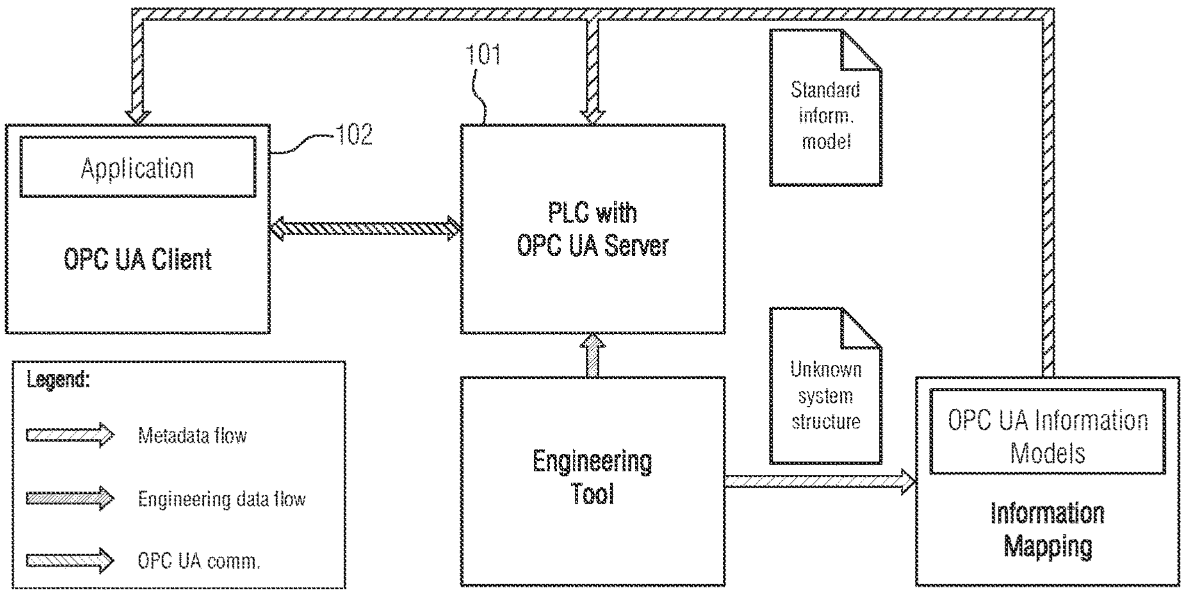
FIG. 1 shows the creation of a standardized information model for existing field devices with a brownfield programmable logic controller (PLC) in accordance with the prior art.
Figure 2:
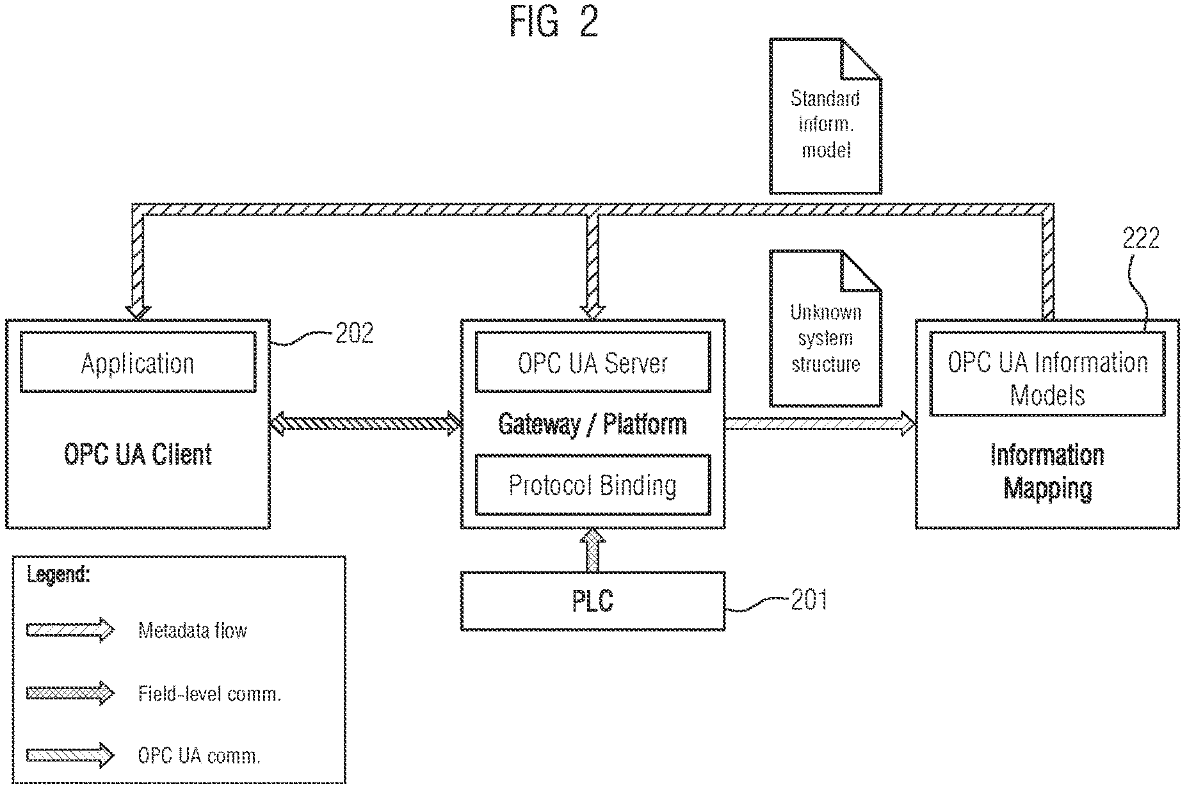
FIG. 2 shows the creation of a standardized information model for existing field devices via a gateway in accordance with the prior art.
Figure 3:
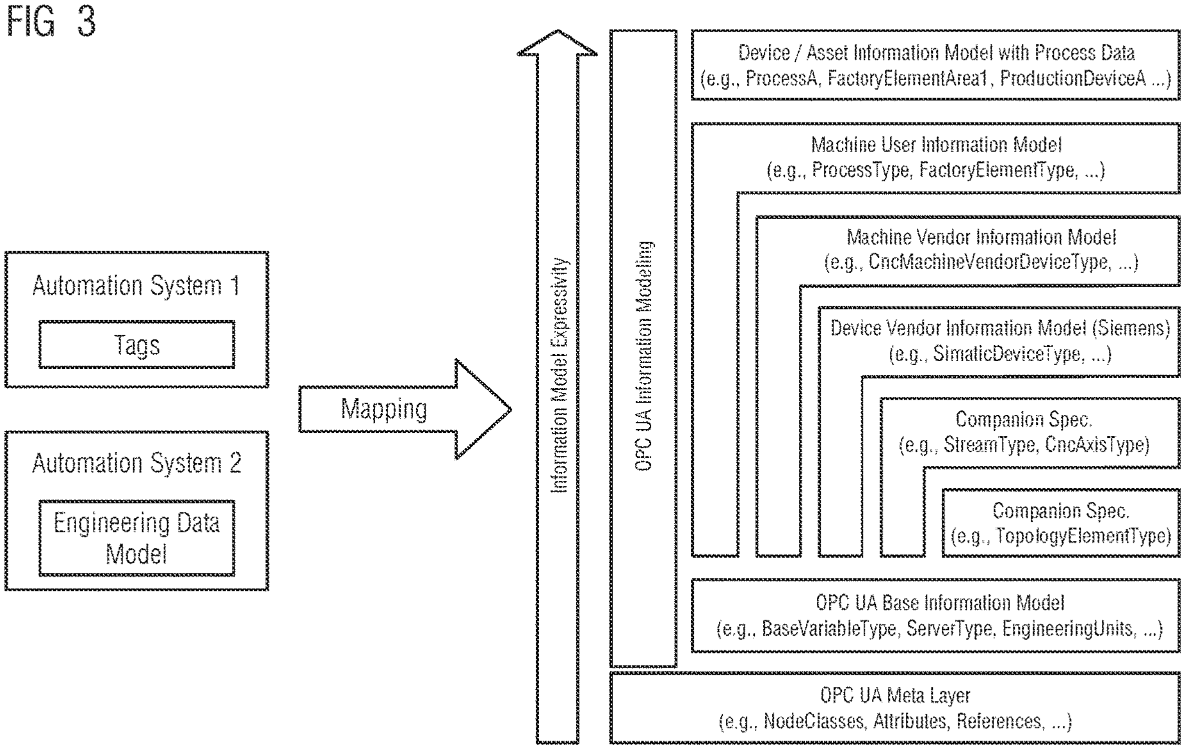
FIG. 3 illustrates mapping of metadata from existing automation systems into OPC UA information models in accordance with the prior art.
Figure 4:
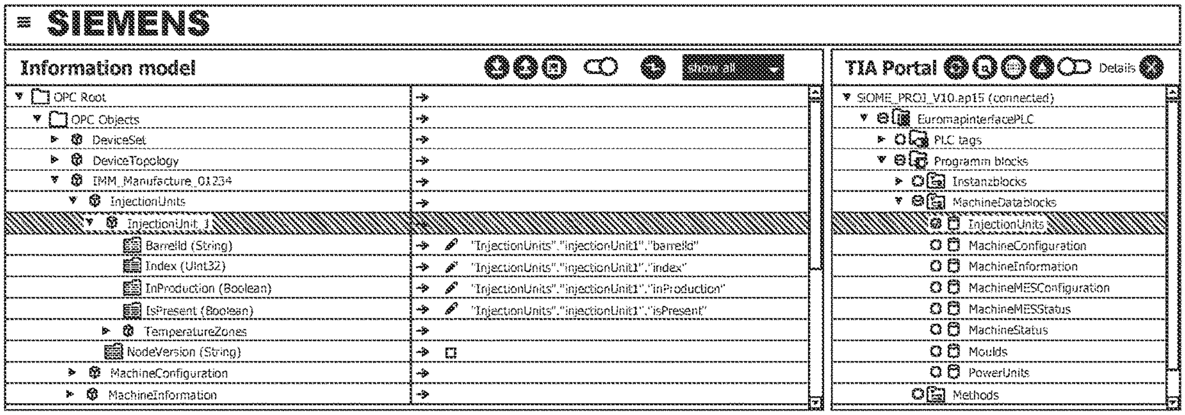
FIG. 4 shows the mapping of existing vendor-specific metadata into standardized OPC UA models with a graphical tool in accordance with the prior art.
Figure 6:
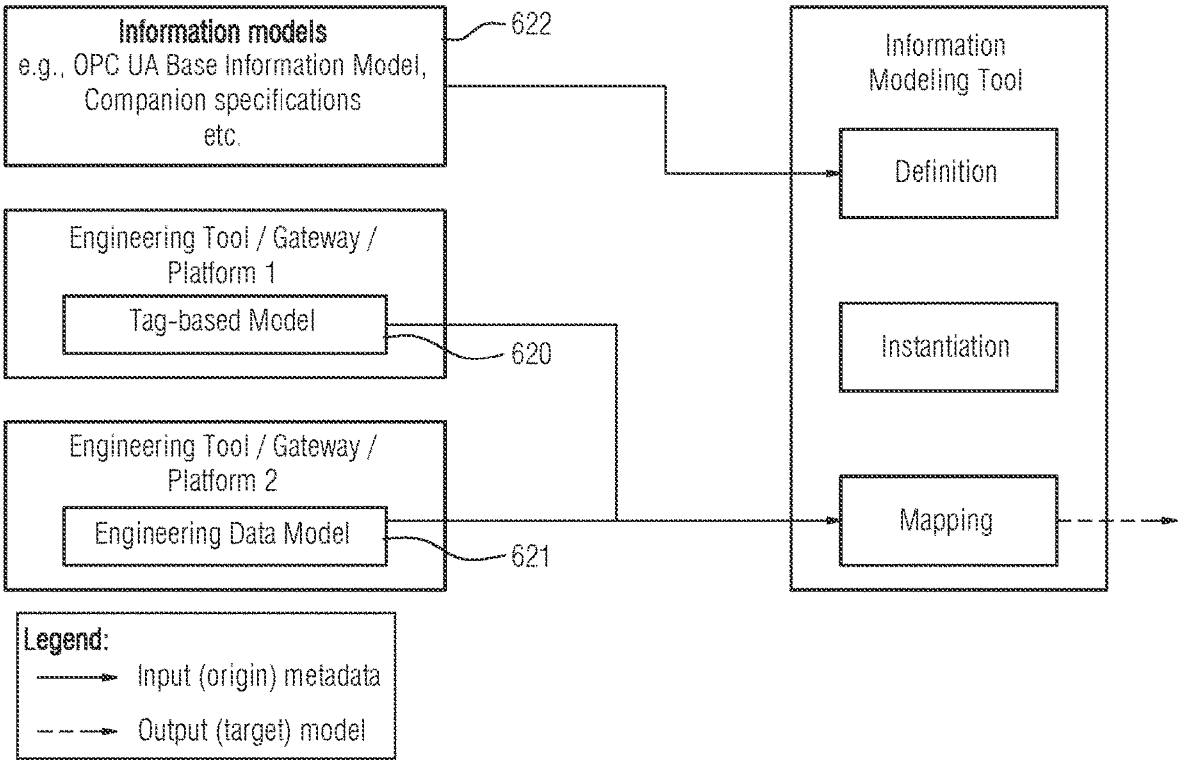
FIG. 6 illustrates the mapping of existing field metadata into OPC UA information models in accordance with the invention.

The left-hand side of FIG. 6 shows the input for the Mapping phase. The existing, vendor-specific metadata may come in different forms. In FIG. 6, only two examples of metadata are shown, i.e., simple tags 620 and engineering object models 621, where both should be converted into a standardized information model 622. However, vendor-specific metadata from existing automation systems may come in numerous variations, and the disclosure is not limited only to these two forms of existing field metadata.

Figure 7:
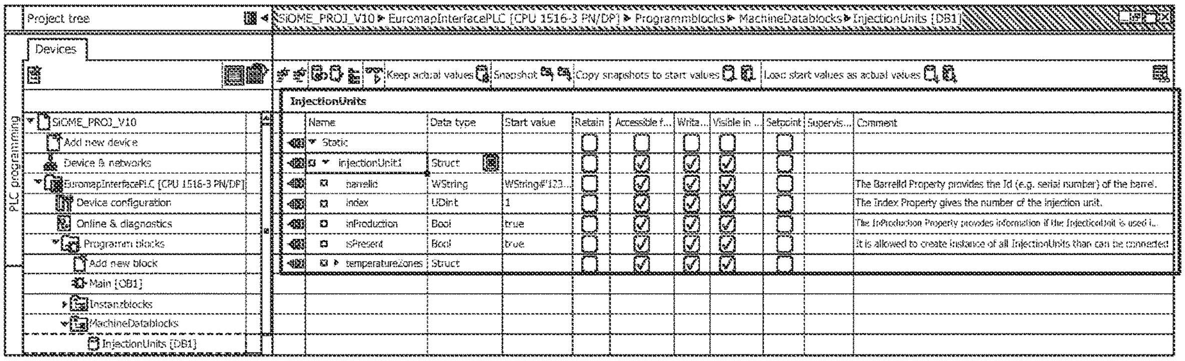
FIG. 7 shows an example of a molding injection machine engineered with the engineering software "Siemens TIA Portal" in accordance with the invention.

With the metadata coming from an existing system (e.g., this data can be exported from an engineering platform) being examined in closer detail, an example of such platform is Siemens TIA Portal. Shown in FIG. 7 is the engineering tool, TIA Portal, with an example project for a molding injection machine. In the right-hand side of the figure is data structure for the injection unit of the machine, i.e., "injectionUnit1". The machine might be regarded as the server and the data structure might be defined according to the first information model. It is a complex data structure, which consists of a few variables: "barrelId", "index", "inProduction" etc. Additionally shown is the data type of each variable (e.g., "index" is UDInt, which is unsigned double integer), and a comment what it is (e.g., "The Index Property gives the number of the injection unit."). All this metadata can be exported from the engineering tool in the standardized AutomationML format, thus forming the first machine-interpretable description.

One excerpt of an AutomationML file for our example is shown in FIG. 8. For example, all information for "barrelId" from TIA Portal is also present in a machine-readable format in the AutomationML file. Thus, this AutomationML file contains data needs to be mapped into the standardized OPC UA information models (those chosen in the Definition phase)

FIG. 9 represents another example of existing vendor-specific metadata. Here, again an existing molding injection machine is shown, for which the metadata is provided via a proprietary platform in a text form. The format is not machine interpretable with standardized semantics. However, a proprietary data model exists that consist of tags with predefined meaning (semantics). In this specific data model, a type "InjectionUnitType" is defined as a "TypeName" ("TypeName" is a specific tag for defining new custom types). In this type, a state is defined, which is a complex data structure (denoted with number 1, see FIG. 9). The structure consists of few variables (e.g., "Index", "BarrelId" "IsPresent" etc.), each assigned with a data type (e.g., "Index" is denoted with number 22, which means it is a Float64 number). With this defined complex type, it is also possible instantiate it. In the example, "InjectionUnit_1" is an instance (data point) of the type "InjectionUnitType", see FIG. 9.

Figure 10:
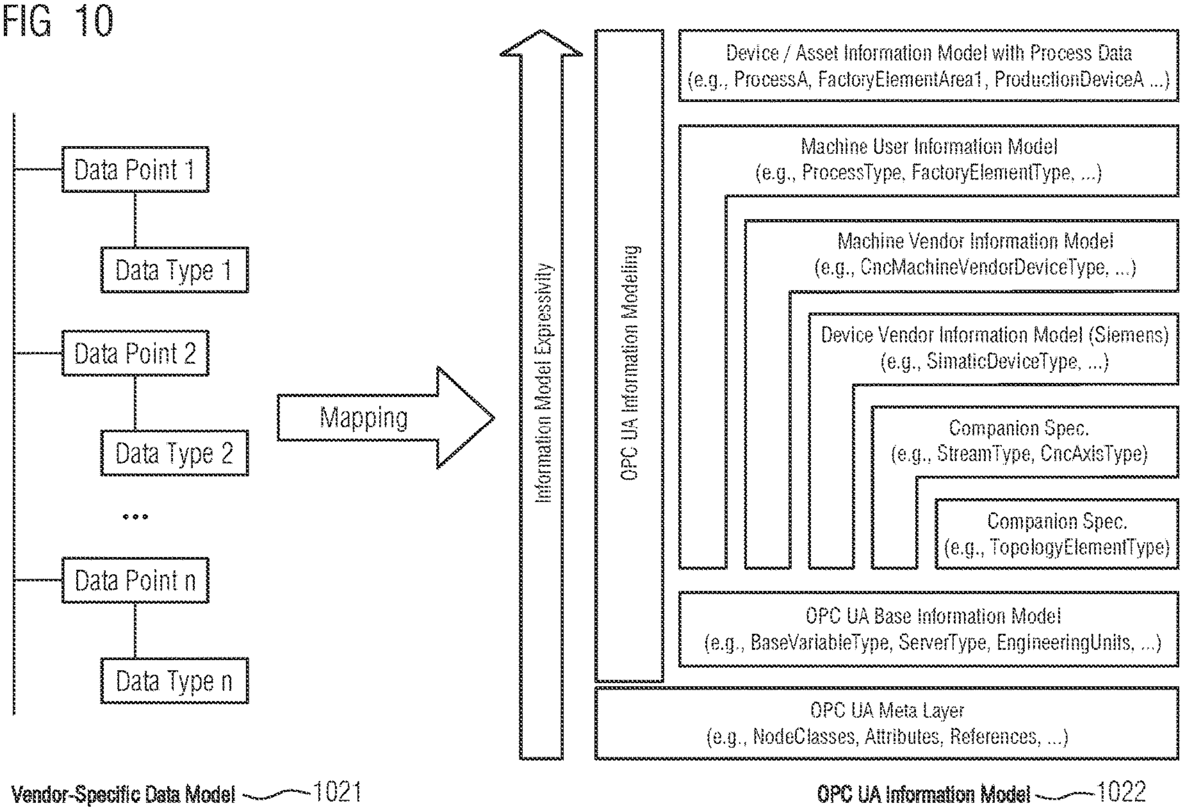
FIG. 10 is a general overview of the problem of mapping existing models into OPC UA information models.

The two examples of existing metadata (see FIG. 8 and FIG. 9) represent data and the structure in different serialization formats (text vs. XML). However, both examples also have a common part. Essentially, they both contain information about data points (including possibly sub data points) and their data types. As a result of the foregoing, it is possible to abstract the input from existing vendor-specific automation systems as shown in the left part of FIG. 10.

With the case of standardized OPC UA information models 1022 (see the right-hand side of FIG. 10) into which the proprietary information model 1021 is sought to be mapped, this information model can be named as the second information model of the client. As mentioned previously, in this example OPC UA models provided by EUROMAP is are used.

Figure 11:
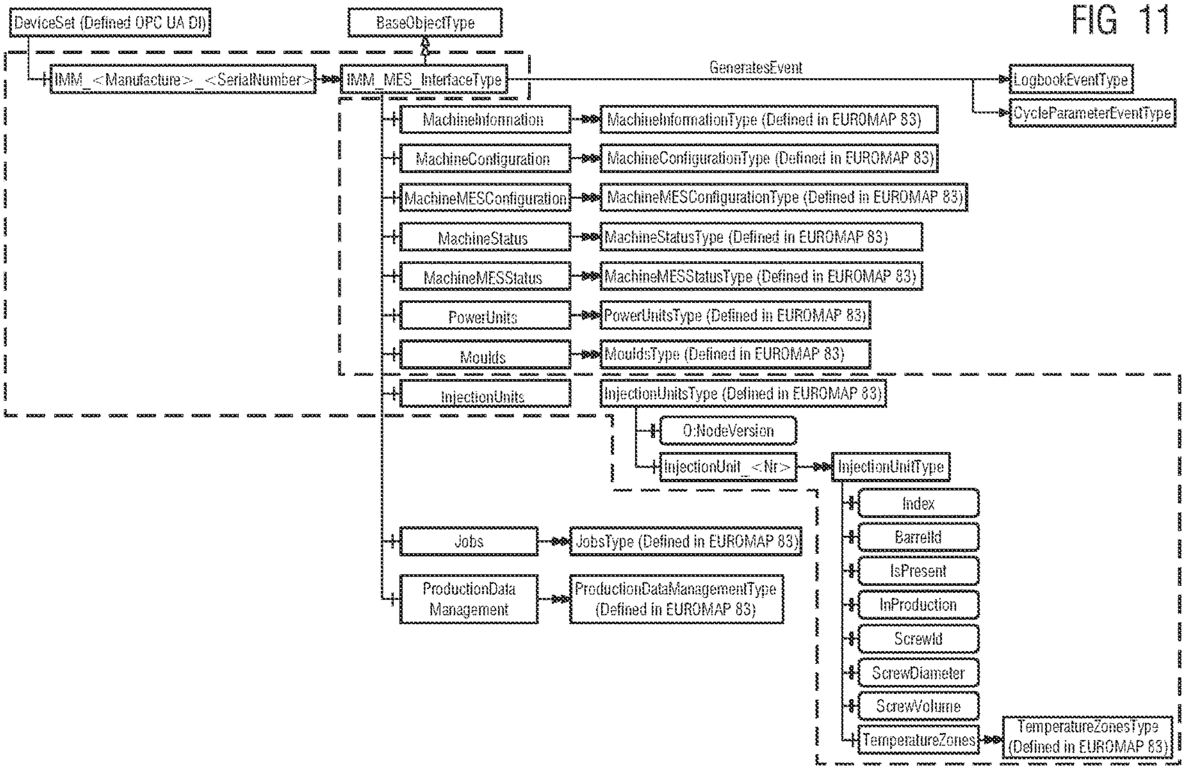
FIG. 11 shows an overview of the interface between injection molding machines (IMM) and manufacturing execution systems (MES) for data exchange in accordance with the invention.

FIG. 11 shows an overview of the interface between injection molding machines (IMM) and manufacturing execution systems (MES) for data exchange. FIG. 11 is taken from EUROMAP 77 Companion Specification and it involves parts of the model from OPC UA DI and EUROMAP 83. It might be regarded as the second machine-interpretable description.

Manufacturing Execution Systems (MES) are used to collect the information generated by IMM. MES provides a central point for both easier quality assurance and the management of jobs and datasets. The goal of EUROMAP 77 is to enable a unique interface for IMM and MES, thereby ensuring the interoperability among different vendors.

The model shown in FIG. 9 covers the following functionalities, such as general information about the IMM (manufacturer, serial number etc.), current configuration and status of the IMM (molds, injection units, power units, and/or logbook of relevant changes on the machine), and/or job management (information on the jobs running on the machine and the parameters of the production).

In the present example, focus is placed only on the InjectionUnit part of the model (marked with the dashed circumfencing line in FIG. 11). The model provides a container for different injection units. Each unit is represented with a number (InjectionUnit_<Nr>) and is an instance of InjectionUnitType. InjectionUnitType is characterized with Index (provides a numeric identifier of the injection unit), BarrelId (provides a serial number of the barrel), IsPresent (provides information whether an injection unit has been installed on an injection machine or not) etc. For further details of the EUROMAP model, an interested reader is referred to EUROMAP 77 and EUROMAP 83 specifications.

The goal is to generate an interface based on OPC UA information models including Companion Specifications (e.g., EUROMAP), and to link it to the variables and methods of an existing vendor-specific model (examples are provided in FIG. 8 and FIG. 9). This goal is depicted in FIG. 12.

Figure 12:
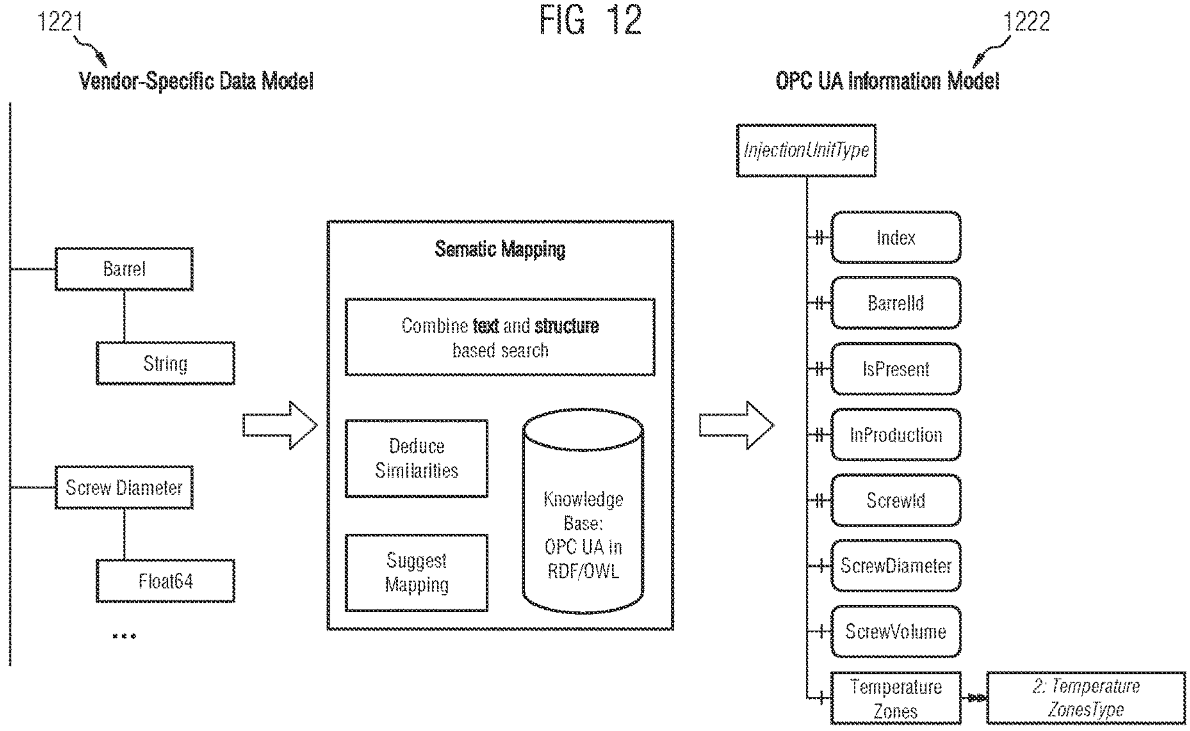
FIG. 12 is an overview of Semantic Mapping—finding similarities based on text and structure-based search in accordance with the invention.

In order to obtain the goal, an approach for Semantic Mapping is implemented (see FIG. 12). Semantic Mapping combines full-text similarity search with structure-based search. The left part of FIG. 12 shows that existing, vendor-specific metadata consists of free text and structured data (Vendor Specific Data Model 1221). Free text is usually used during the engineering of automation systems to name variables, data points, data structures and so on (e.g., "Barrel", "Screw Diameter" etc.). These freely defined tags must be mapped to standardized concepts (OPC UA Information Model 1222). For this purpose, full-text similarity search is deployed. Furthermore, data structures can also be extracted from existing metadata. In the present example, the structure consists of variables (e.g., "Barrel", and/or "Screw Diameter"), each assigned with a data type. Variables can be further put together to form more complex structures. Data types (e.g., String, Float64) may also be combined in complex data types. All this part of information is not free text. Thus, within existing, vendor-specific metadata, have structure information is also present. These structures could be utilized during the mapping to standardized semantic. For that reason, we also deploy structure-based search.

The method for Semantic Mapping, based on the combination of full-text similarity search with structure-based search, is accomplished in three steps:

Convert OPC UA information models to RDF/OWL (to make them accessible for semantic search).

Deduce similarities (build similarity indexes).

Suggest and implement Semantic Mapping.

Initially, OPC UA Information must be made machine-interpretable. In order to enable search over semantic structures of information models, we convert OPC UA information models in a machine-interpretable version of them. For this purpose, we use W3C standards RDF and OWL. In Appendix A.2 an excerpt of InjectionUnitsType definition from OPC UA EUROPMAP77 Companion specification is shown. InjectionUnitsType, its Instance Declaration (InjectionUnit_<Nr>), and variables (BarrelId, ScrewDiameter etc.) are shown in the right-hand side of FIG. 11 and FIG. 12. The same information is formally defined in an OPC UA EUROPMAP77 Companion specification, see Appendix A.2.1, Appendix A.2.2, Appendix A.2.3, and Appendix A.2.4, respectively. As mentioned, a machine-interpretable version of this information is needed. The conversion is possible to be achieved programmatically. The output of the conversion for our example in Appendix A.2 is provided in Appendix A.3, i.e., Appendix A.3.1, Appendix A.3.2, Appendix A.3.3, and Appendix A.3.4, respectively.

Second, Similarity Indexes must be built. For the purpose of enabling full-text similarity search, a similarity index for information models must be built. An index for unstructured text is not requires to be built, however. Instead, we do this for structured information. By converting OPC UA information models in a machine-interpretable form, a knowledge graph is created. In this graph, standardized concepts are connected with semantic relations. By building a full-text similarity index over such a knowledge graph, the matching of semantically close concepts becomes enables. The results obtained from full-text similarity search cannot be obtained neither via structured nor via full-text search queries, separately. The combination of both brings the benefit.

In Natural Language Processing (NLP) and text mining there exists several methods to build similarity indexes, e.g., statistic semantics methods like Random Projection, Random Indexing, Singular Value Decomposition, and others.

A specific implementation of this approach could, e.g., use GraphDB. GraphDB utilizes the Semantic Vectors for building similarity indexes. The RDF graph is enriched with semantic similarity indices, based on a highly scalable vector space model. Various indices are defined, which cover specific types of standardized models. For example, in a single knowledge graph, there could be one index covering OPC UA Object Types defined in a Companion specification, another one could cover OPC UA Objects, followed yet another for Variable Tapes, Variables, Properties, and so on. It is possible to also build indexes depending on the input from existing, vendor-specific models. For example, with the input focused on InjectionUnitsType of the whole IMM_MES_Inference (see FIG. 11), then an index is built for InjectionUnitsType. MachineMESStatus, MachineMESConfiguration, and other parts from FIG. 11 may be ignored, or separate indexes for these other aspects can also be built. Therefore, depending on user-specific case, the information space can be split into smaller chunks and complexity of the search can be reduced. The chunks of complete knowledge graph can be extracted with structure-based search (SPARQL queries).

In accordance with the invention, it is also possible to also re-structure the knowledge graph into a new knowledge graph that is more suitable for Semantic Mapping of an existing input data model. The re-structuring of one model into another one can be also performed with structure-based queries (SPARQL queries). Information represented in RDF/

OWL supports SPARQL querying. Consequently, this is yet an additional benefit of converting OPC UA information models in RDF/OWL.

FIG. 13 shows a SPARQL query, which builds similarity index of the OPC UA exemplary model in GraphDB. After executing this query, a similarity index for free-text search based on any literal in the knowledge graph will be ready for querying. The how this index is used for the Semantic Mapping is subsequently explained.

Third, Semantic Mapping is implemented. Semantic Mapping combines full-text similarity search with structure-based search. With reference to the example from FIG. 12, the left part of the figure shows existing, vendor-specific metadata for variables, data points, data structures and so on (e.g., “Barrel”, “Screw Diameter” etc.). These freely defined tags must be mapped to standardized concepts, e.g., of OPC UA information models and Companion specifications. Furthermore, data structures can also be extracted from existing metadata too. In the example, the structure consists of variables (e.g., “Barrel”, “Screw Diameter” etc.), each assigned with a data type (e.g., String, Float64).

It is common that by mapping existing vendor-specific metadata, a tag or a tree (e.g., a data point with its data type) is mapped to a graph (an OPC UA-based model). The mapping is easier when starting it from the leaves of a tree, see FIG. 11, and mapping upwards. FIG. 14 shows an exemplary SPARQL query for finding a leaf node based on tag and data type. In this example, a tag is “barrel”, and data type is “String” (as also shown in FIG. 12). This SPARQL query is executed against the RDF information provided in Appendix A.3. The result is presented in FIG. 15. What is obtained is a unique ID of the leaf node (documentID) and score (probability that the tag is similar to the description of leaf node). The result nodes (with an ID: i6018 and an ID: i6097) are two instance declarations of the property “BarrelId” from FIG. 12.

Figure 16:
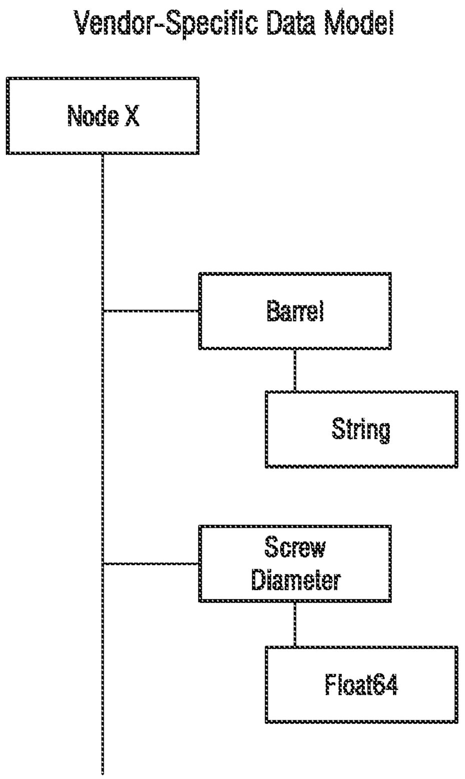
FIG. 16 illustrates an exemplary tree-like search of vendor-specific data in accordance with the invention.

There can be a need to find out whether there exists an unknown node that has two leaf nodes as shown in FIG. 16. As such, the description of one leaf node should be similar to a tag “barrel” with data type “String”. The second leaf node should be similar to a tag “screw diameter”, and its data type is “Double”. This structure can be explored with a SPARQL query presented in FIG. 17.

Results from the query from FIG. 17 are shown in FIG. 18. In the first column the leaf nodes similar to the tag “barrel” are retrieved with the similarity score presented in the second column. Similarly, the third and fourth column show results for the second leaf node. Finally, the last column shows results for the parent node (unknown node). These results may be used by a user when mapping the existing data models into standardized information models.

In general, leaf nodes can be connected over n other nodes to a parent node. For example, BarrelID and Index are connected over the InjectionUnit node to the IMM_MES_Interface node, see FIG. 11. These relations exist in a knowledge graph. Thus, with SPARQL queries similar to one from FIG. 17 and a recursive procedure it is possible to find out any parent node that is connected to a leaf node. Furthermore, it is possible to map that leaf node to appropriate data from an existing vendor-specific model.

It should be noted in the example for an existing vendor-specific model (see FIG. 12) the data type of “Screw Diameter” is “Float64”. On the other hand, in the standardized OPC UA model the data type for that property is “Double” (see Appendix A.2.4). Hence, in order to get results based on the query from FIG. 17 the knowledge graph must be extended by stating that data type “Float64” is essentially equivalent to “Double”. In RDF/OWL based models there are few options to realize this, e.g., by subtyping “Double” with “Float64”, creating an equivalent class or data type, or using OWL property owl:sameAs (depending whether two entities, which we want to make equivalent, are classes or instances). It is also possible to create a rule or data structure KP that expresses such an equivalence. Extensions of a knowledge graph, which contains standardized knowledge, are provided in Knowledge Packs (KPacks). KPack is created for each distinguished vendor-specific input model. KPs provide an elegant solution to extend standardized models with proprietary extensions. It is convenient to realize KPacks in RDF/OWL and to integrate them with the different parts of the knowledge graph.

Figure 19:
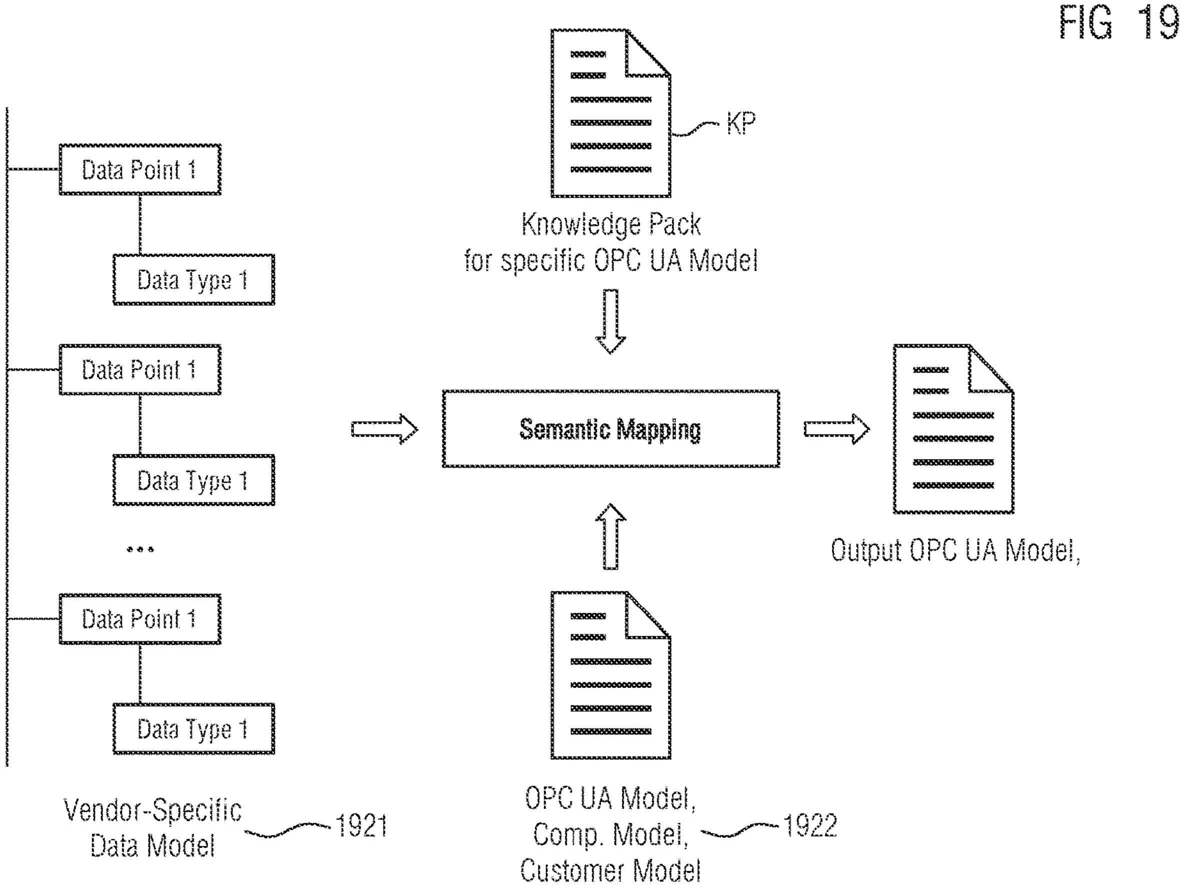
FIG. 19 illustrates the application of a data structure "Knowledge Pack" which makes the Semantic Mapping more general in accordance with the invention.

FIG. 19 illustrates the role of Knowledge Packs KP in the Semantic Mapping. Vendor-specific Data Model 1921 is an existing data model for brownfield automation system (e.g., tag-based, unknown system structure encoded in AutomationML description or similar). It needs to be mapped into an OPC UA-based model 1922 in order to create Output OPC UA Model. In practice, there are different options to be chosen for an OPC UA-based model. Thus, OPC UA Model, based on Companion models and/or customer-defined models (depicted in the lower part of FIG. 19) provides basic model and structure that should be used during the mapping. It is the target model where the mapping should lead. Essentially, it provides a template or basic structure that the input model should be mapped into. An example of OPC UA Model is OPC UA DI. In the future, a good candidate for such a model will be upcoming Companion specification OPC UA FLC. Companies also define their own models based on OPC UA standard and adjust them for specific needs. Thus, any of these options may be taken as the model denoted as the OPC UA Model in FIG. 19. How to map the input data model into this model is defined in a data structure KP named Knowledge Pack or KPack. KPack is realized as a set of mapping OWL axioms, rules, and queries that are created for a specific input data model and a chosen OPC UA Model. Semantic Mapping finally provides the mapping. It is shown in FIG. 12 and described throughout this work. Semantic Mapping is realized by executing SPARQL queries with free-text similarity search and structure-based search. By evaluating these queries, evaluation OWL axioms and rules from a KPack, as well as the knowledge contained in the knowledge graph, may also be required. For each piece of data being mapped to a corresponding standardized information (a variable, property, and/or object) a user gets a set of choices sorted based on a similarity score. A user may browse these results and select a mapping choice. In this way, the inventive method and system provide a semi-automated mapping. The solution provides benefits in terms of time a user needs to spend on the mapping, and occurrence of the achieved mapping. The final output of Semantic Mapping (i.e., Output OPC UA Model) is a node set that is automatically generated, e.g., as presented in FIG. 5.

Finally, the created mapping will be used in a gateway entity or gateway device for performing data exchange between e.g. a PLC and a MES system or, in general, between a client and a server.

Figure 20:
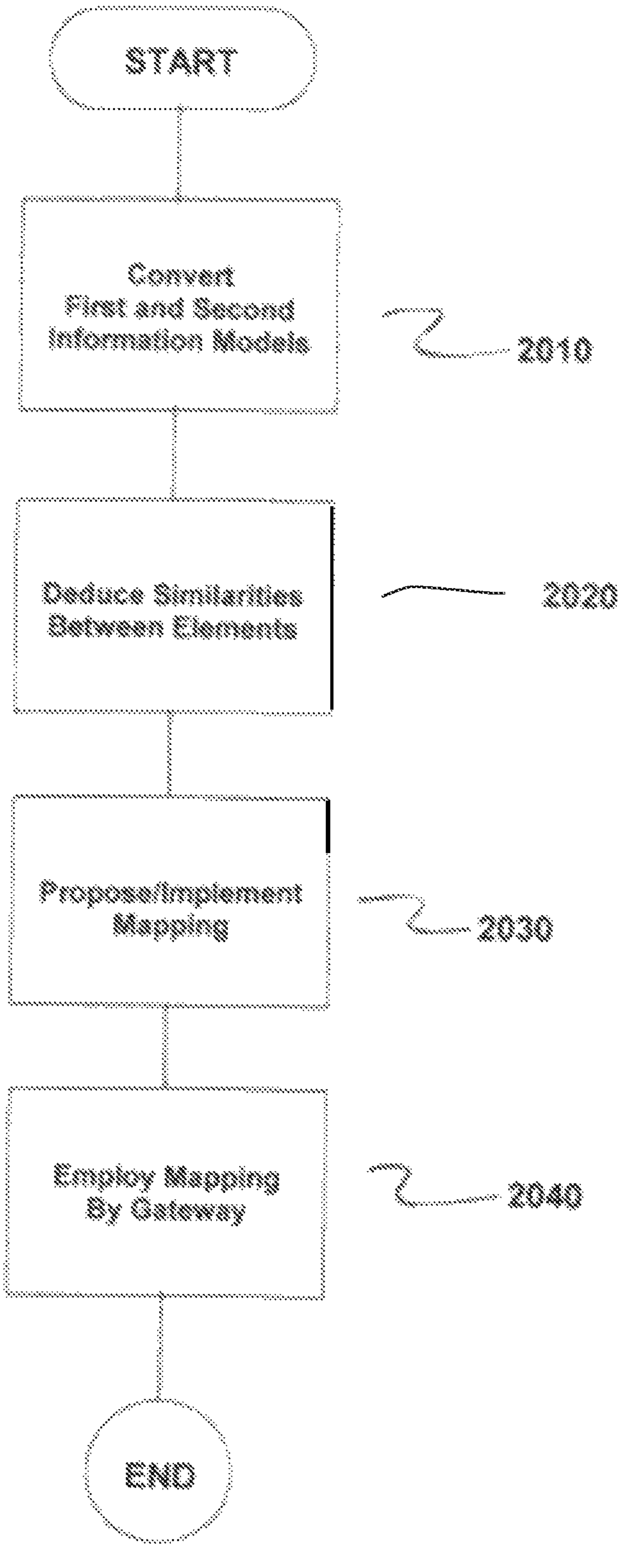
FIG. 20 is a flowchart of the method in accordance with the invention.

FIG. 20 is a flowchart of the method for exchanging data between a server 101, 201 and a client 102, 202 in an industrial data network, where the server 101, 201 employs a first information model 620, 621, 1021, 1221, 1921 for information interchange, and the client 102, 202 employing a second information model 222, 622, 1022, 1222, 1922 for information interchange.

The method comprises converting the first 620, 621, 1021, 1221, 1921 and the second information models 222, 622, 1022, 1222, 1922 in a first and a second machine-interpretable description, as indicated in step 2010.

Next, similarities between elements of the first and the second machine-interpretable description are deduced, as indicated in step 2020.

Next, a mapping of at least one element of the first information model to an element of the second information model based on the deduced similarities in text and in structure is proposed and implemented, as indicated in step 2030.

Next, a gateway entity employs the mapping for a data exchange between the server 101, 201 and the client 102, 202, as indicated in step 2040.

The system and method provide the following advantages:

- Benefits in terms of the time a user needs to spend on the mapping, and occurrence of the achieved mapping.
- The method is general in a sense that it provides the semantic mapping of virtually any input, vendor-specific metadata, and any output model (including OPC UA-based models).
- The method solution is extensible in terms of adding new Knowledge Packs (to support the mapping information of new models) and is easy to be maintained (when integrating existing knowledge with the new one).

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for exchanging data between an industrial controller including a processor and server and a client in an industrial data network, the server employing a first information model for information interchange, and the client employing a second information model which differs from the first information model for information interchange, the method comprising:

converting the first and the second information models which differ into a first and a second machine-interpretable description;

deducing similarities between elements of the first and the second machine-interpretable descriptions, wherein the first machine-interpretable description is in an AutomationML format, by building a number of full-text similarity indices over the machine-interpretable descriptions, each similarity index covering a specific type of a standardized information model, and choosing an index of the indices for said deduction;

proposing and implementing a mapping of at least one element of the first information model to an element of the second information model based on the deduced similarities in text and in structure; and employing, by a gateway entity, the mapping for a data exchange between the server and the client.

2. The method according to claim 1, wherein the server comprises an industrial controller, and the first information model comprises a tag-based information model described by first meta-data which is utilized as the first machine-interpretable description.

3. The method according to claim 1, wherein the client comprises an application employing a standardized Open Platform Communications Unified Architecture (OPC UA) information model as the second information model.

4. The method according to claim 3, wherein the OPC UA information model is converted into a Resource Description Framework/Web Ontology Language (RDF/OWL) representation, the RDF/OWL representation comprising the second machine-interpretable description.

5. The method according to claim 1, further comprising:

storing, after said proposing and implementing, mapping information in a data structure comprising a Knowledge Pack, and deploying said data structure to the gateway entity.

6. A system for exchanging data with a client in an industrial data network, the system comprising:

an industrial controller including a processor and server which employs a first information model for information interchange, the client employing a second information model which differs from the first information model for information interchange;

a converter for converting the first and the second information models which differ into a first and a second machine-interpretable description;

a deducer for deducing similarities between elements of the first and the second machine-interpretable description, wherein the first machine-interpretable description is in an AutomationML format, by building a number of full-text similarity indices over the machine-interpretable description, each similarity index covering a specific type of a standardized information model, and an index of the indices being chosen for said deduction;

a suggester for proposing and implementing, based on the deduced similarities in text and in structure, a mapping of at least one element of the first information model to an element of the second information model; and a gateway entity employing the mapping for the data exchange between the server and the client of the industrial automation network.

7. The system according to claim 6, wherein the server comprises an industrial controller, the first information model comprises a tag-based information model described by first meta-data which is utilized as the first machine-interpretable description.

8. The system according to claim 6, wherein the client comprises an application employing a standardized Open Platform Communications Unified Architecture (OPC UA) information model as the second information model.

9. The system according to claim 7, wherein the client comprises an application employing a standardized Open Platform Communications Unified Architecture (OPC UA) information model as the second information model.

10. The system according to claim 8, wherein the converter is configured to convert the OPC UA information model into a Resource Description Framework/Web Ontology Language (RDF/OWL) representation, the RDF/OWL representation being the second machine-interpretable description.

11. The system according to claim 6, wherein the system is configured to store the mapping information in a data structure comprising a Knowledge Pack, and configured to deploy said data structure to the gateway entity.

12. The system according to claim 7, wherein the system is configured to store the mapping information in a data structure comprising a Knowledge Pack, and configured to deploy said data structure to the gateway entity.

13. The system according to claim 8, wherein the system is configured to store the mapping information in a data structure comprising a Knowledge Pack, and configured to deploy said data structure to the gateway entity.

14. The system according to claim 10, wherein the system is configured to store the mapping information in a data structure comprising a Knowledge Pack, and configured to deploy said data structure to the gateway entity.

* * * * *